(No Model.)
L. CARR.
HAME.
No. 270,577. Patented Jan. 16, 1883.
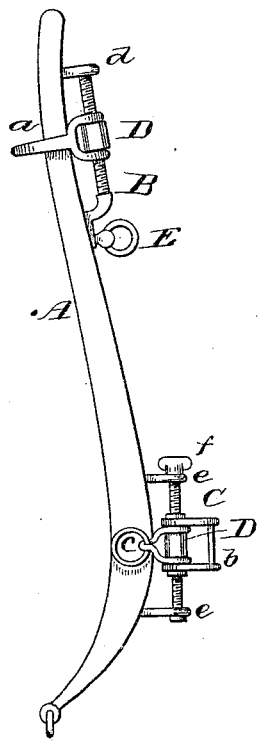
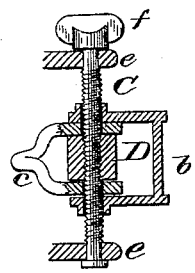
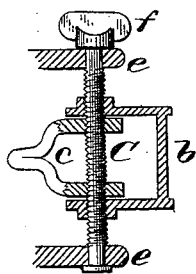
WITNESSES:
Jas. F. DuHamel.
Walter S. Dodge.
INVENTOR:
Laurence Carr
by Dodge Son,
Attys.

UNITED STATES PATENT OFFICE.

LAURENCE CARR, OF SHAKOPEE, MINNESOTA.

HAME.

SPECIFICATION forming part of Letters Patent No. 270,577, dated January 16, 1883.

Application filed July 20, 1882. (No model.)

*To all whom it may concern:*

Be it known that I, LAURENCE CARR, of Shakopee, in the county of Scott and State of Minnesota, have invented certain Improvements in Hames, of which the following is a specification.

My invention relates to hames for harness; and it consists in providing the same with screw-threaded stems and nuts, by which the hame-strap, traces, and breast-chain may be raised or lowered, as desired, without being detached from the hames.

In the accompanying drawings, Figure 1 represents a hame provided with my improved adjusting devices; Figs. 2 and 3, enlarged detail views.

It is well known that in order to enable a horse to pull to best advantage it is necessary to carefully adjust the point of attachment of the traces; and it is also desirable to provide for the adjustment of the hame-straps and breast-chain, the latter in the case of double harness. Hitherto it has been necessary to either detach the traces, hame-straps, and breast-chain, or to remove all strain therefrom before any change of adjustment could be effected. By my plan, however, this difficulty is entirely overcome, and the adjustments may be made with the greatest ease and nicety.

My improved construction will be readily understood upon referring to the drawings, in which A represents the hame; B, a threaded stem carrying the eye or loop *a*, in which the hame-strap is carried; and C, a second threaded stem, carrying the breast-chain clip *b* and trace-ring or clip *c*, each stem being furnished with a nut, D, which works between the two arms of the clip or clips which it carries, and prevents their movement up or down, except as the nut is moved.

The hame-strap eye or loop *a* is represented as mounted upon a threaded stem, one end of which is bent and flattened to receive a fastening-screw, which in the present instance is the stem of the rein-ring E. The other end of the stem is carried by an eye, *d*, screwed into or passed through the hame, as shown. Under this construction it is necessary, in order to raise or lower the loop or eye *a*, to turn the nut D up or down, as required.

The stem C is represented as journaled in eyes or studs *e*, in order that it may be freely turned to raise and lower the nut D, the end of the stem being furnished with a thumb-piece or button, *f*, by which to turn it. The nut D being held against turning, either by causing it to engage with the clips or fittings *b c*, or by grasping it with the fingers or with a suitable tool, it is only necessary to turn the screw-stem C to raise or lower said nut and with it the said clips or fittings.

Instead of employing the nut D, the arms of the clips or fittings *b c* may be threaded, as in Fig. 3, and raised and lowered in the same manner as the nut; but this of course applies only to the stem C, because there is not sufficient room to carry the fittings around the stem between it and the body of the hame, as would be necessary in the case of the fixed stem B. In practice I prefer to employ the fixed or non-rotating stem B at the top and the rotating stem C at the bottom, as shown, though I do not limit myself to this arrangement.

The clip or fitting *b* is a rectangular yoke to receive the tug or trace, and the clip or fitting *c* is a twisted or triangular yoke carrying a ring for the attachment of the breast chain or strap.

The hames will be made of any usual form, style, and materials.

Having thus described my invention, what I claim is—

1. The combination, substantially as described and shown, of a hame, a threaded stem attached to said hame, a clip or fitting encircling said stem, and a nut fitting upon the stem, and arranged to bear against the clip or fitting and to raise and lower the same, substantially as explained.

2. The herein-described hame, consisting of the body A, provided with threaded stem B, carrying loop or fitting *a* and nut D, and with threaded stem C, carrying nut D and clips or fittings *b c*, all combined and operating as set forth.

LAURENCE CARR.

Witnesses:
DAN. L. HOW,
DENNIS FLAHERTY.